(12) United States Patent
Suzuki (10) Patent No.: US 12,531,043 B2
(45) Date of Patent: Jan. 20, 2026

(54) KEYBOARD COVER, STORING METHOD OF KEYBOARD COVER, AND ELECTRONIC MUSICAL INSTRUMENT

(71) Applicant: CASIO COMPUTER CO., LTD., Tokyo (JP)

(72) Inventor: Chihiro Suzuki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 158 days.

(21) Appl. No.: 18/337,793

(22) Filed: Jun. 20, 2023

(65) Prior Publication Data

US 2023/0410778 A1    Dec. 21, 2023

(30) Foreign Application Priority Data

Jun. 21, 2022   (JP) .................................. 2022-099751

(51) Int. Cl.
*G10H 1/32*       (2006.01)
*G10C 3/12*       (2006.01)

(52) U.S. Cl.
CPC ................. *G10H 1/32* (2013.01); *G10C 3/12* (2013.01)

(58) Field of Classification Search
CPC ..................................... G10H 1/32; G10C 3/12
See application file for complete search history.

(56) References Cited

U.S. PATENT DOCUMENTS 4,593,593 A  *  6/1986  Bellini .................... G10H 1/32
                                                        984/344
2023/0410778 A1*  12/2023  Suzuki ..................... G10H 1/32

FOREIGN PATENT DOCUMENTS

| JP | S49138816 U  | 11/1974 |
| JP | S5235220 U   | 3/1977  |
| JP | H01125498 U  | 8/1989  |
| JP | 2002287753 A | 10/2002 |
| JP | 2003308070 A | 10/2003 |

OTHER PUBLICATIONS

Notice of Reasons for Refusal dated Aug. 26, 2025 received in Japanese Patent Application No. 2024-152302.

* cited by examiner

*Primary Examiner* — Dedei K Hammond
(74) *Attorney, Agent, or Firm* — Scully, Scott, Murphy & Presser, P.C.

(57) ABSTRACT

Disclosed is a keyboard cover including: an upper surface cover that is able to cover an upper surface of an instrument body including a keyboard; a front hanging portion that is provided at a front end of the upper surface cover so as to be able to turn into a folded-in state of overlapping with the upper surface cover and that is able to hang down so as to cover a front end surface of the keyboard; and a handle that is provided to the front hanging portion so as to extend in a longitudinal direction of the instrument body and is able to be bent to be deformed. The keyboard cover is able to be turned into a storable state by maintaining, with the handle, a state in which the entire keyboard cover is made compact.

17 Claims, 8 Drawing Sheets

KEYBOARD COVER, STORING METHOD OF KEYBOARD COVER, AND ELECTRONIC MUSICAL INSTRUMENT

REFERENCE TO RELATED APPLICATIONS

This application is based upon and claims the benefit of priority from the prior Japanese Patent Application No. 2022-099751, filed on Jun. 21, 2022, the entire contents of which are incorporated herein by reference.

TECHNICAL FIELD

The present disclosure relates to a keyboard cover, a storing method of a keyboard cover, and an electronic musical instrument.

DESCRIPTION OF RELATED ART

In a musical instrument having a keyboard (for example, an electronic keyboard instrument), the keyboard and the like are provided on the upper surface of the instrument body. In the exposed state where the keyboard and the like are not covered, dust and the like tend to accumulate on the keyboard and the like. If the accumulated dust and the like enter the instrument body from the gap, it causes malfunctions and other problems of the musical instrument.

Therefore, conventionally, there is a lid covering the upper surface of the instrument body provided integrally with the instrument body. However, providing the lid integrally with the instrument body leads to the increase in weight and size of the instrument body. In some cases, the lid is not provided from the viewpoint of design or the like.

If the musical instrument does not have a lid, a cover (keyboard cover) which is made of fabric or the like and covers the upper surface of the instrument body when the musical instrument is not played is also provided removably with respect to the instrument body.

SUMMARY OF THE INVENTION

However, in the case of a removable cover, it may be difficult to start playing easily and quickly when the user wants to play, since it is difficult to find a place to put the keyboard cover that was removed from the instrument body at the time of playing. Also, if the keyboard cover is placed on the floor, the cover itself may become dirty, which may cause the instrument body to become dirty when the cover is placed on the instrument body.

According to an aspect of the present disclosure, there is provided a keyboard cover including: an upper surface cover that is able to cover an upper surface of an instrument body including a keyboard; a front hanging portion that is provided at a front end of the upper surface cover so as to be able to turn into a folded-in state of overlapping with the upper surface cover and that is able to hang down so as to cover a front end surface of the keyboard; and a handle that is provided to the front hanging portion so as to extend in a longitudinal direction of the instrument body and is able to be bent to be deformed, wherein the keyboard cover is able to be turned into a storable state by maintaining, with the handle, a state in which the entire keyboard cover is made compact.

According to an aspect of the present disclosure, there is provided a storing method of a keyboard cover that includes: an upper surface cover that covers an upper surface of an instrument body including a keyboard in a keyboard protecting state; a front hanging portion that includes a handle which is provided extending in a longitudinal direction of the instrument body and is able to be bent to be deformed and that is provided at a front end of the upper surface cover so as to be able to hang down to cover a front end surface of the keyboard; and a locking piece that is provided at a rear end of the upper surface cover so as to be able to hang down on a rear end of the instrument body, the storing method comprising folding the upper surface cover and the front hanging portion that includes the handle in the longitudinal direction and turning the keyboard cover into a storable state of maintaining, with the handle, a folded state in which the keyboard cover is folded to be compact.

According to an aspect of the present disclosure, there is provided an electronic musical instrument comprising: the above keyboard cover; and an instrument body that includes a hook to hook the keyboard cover, wherein the keyboard cover includes a handle that turns the keyboard cover into a storable state by maintaining a folded state in which the keyboard cover is folded to be compact, and the handle of the keyboard cover in the storable state is hooked to the hook.

BRIEF DESCRIPTION OF DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein.

DETAILED DESCRIPTION

Referring to FIGS. 1 to 17, an embodiment of a keyboard cover, a storing method of the keyboard cover and an electronic musical instrument according to the present disclosure will be described.

Although the embodiments described below have various technically preferred limitations for carrying out the present disclosure, the scope of the present disclosure is not limited to the following embodiments and illustrations.

Figure 1:
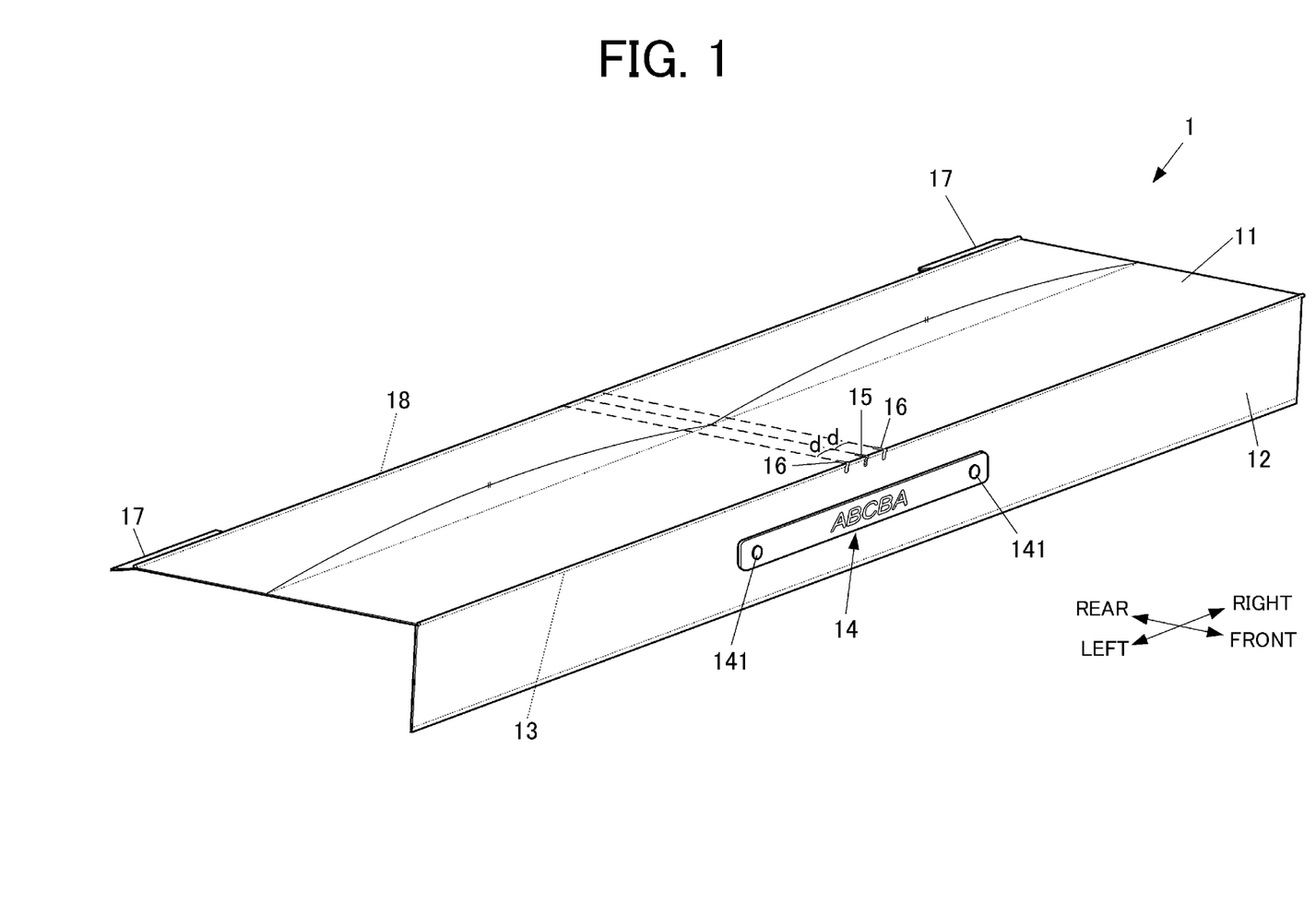
FIG. 1 is a perspective view showing a main part configuration of a keyboard cover in the present embodiment.
Figure 2:
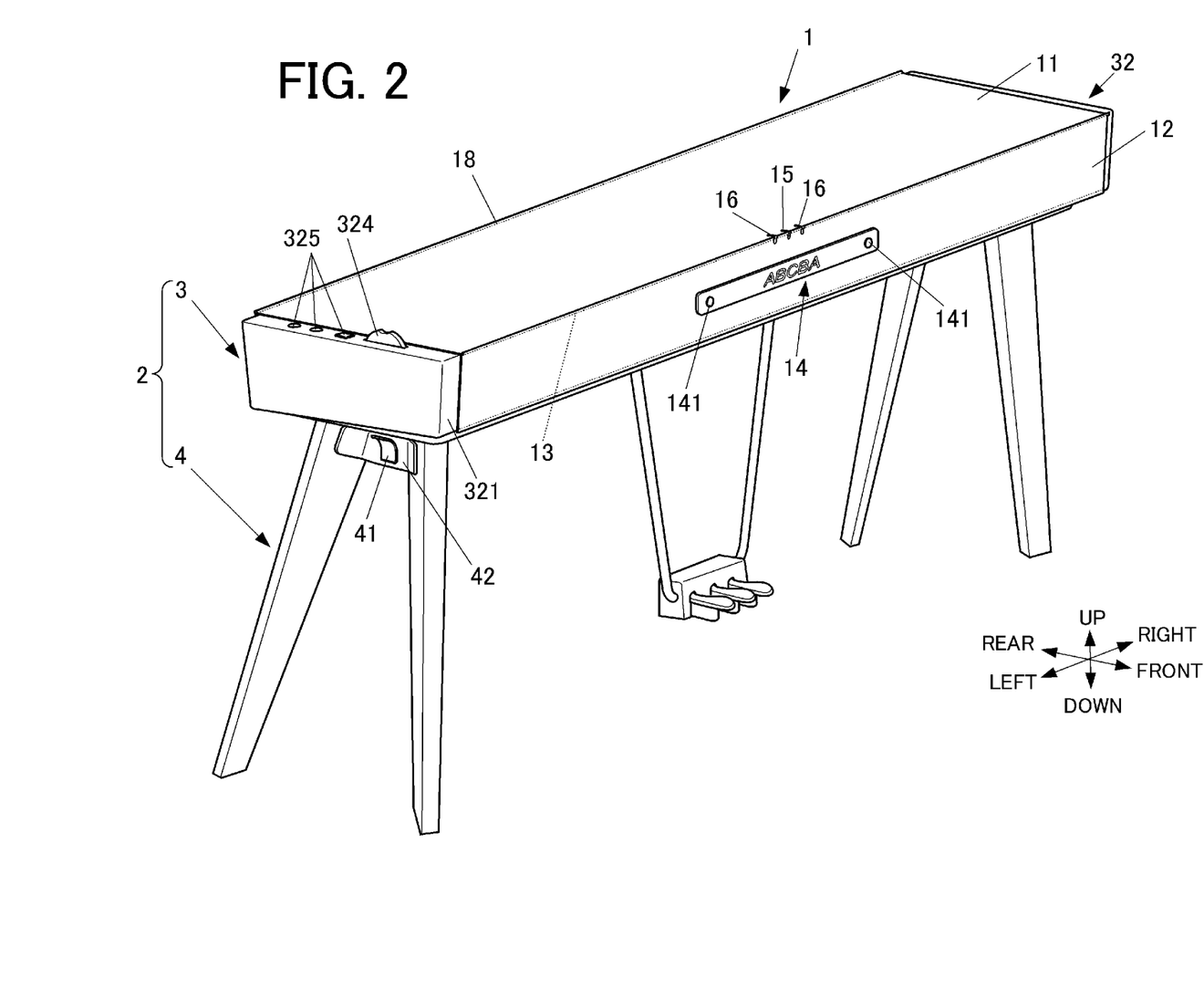
FIG. 2 is a perspective view of a keyboard instrument in a keyboard protecting state having the instrument upper surface covered with the keyboard cover shown in FIG. 1.
Figure 3:
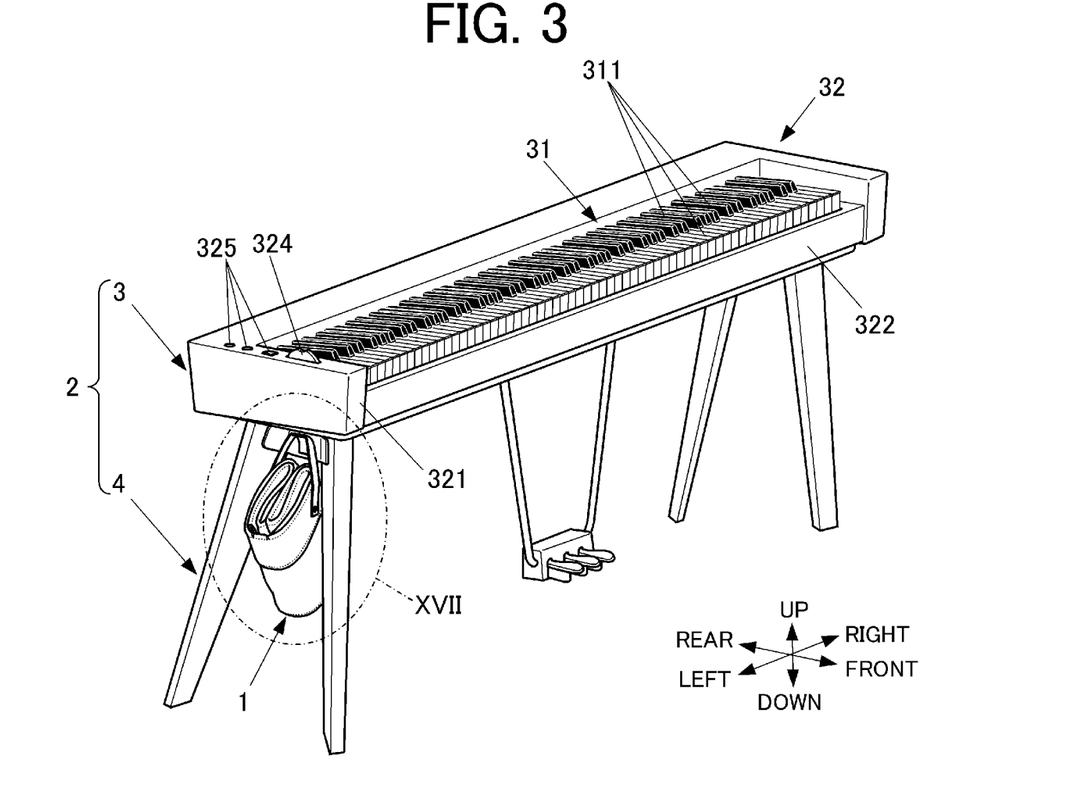
FIG. 3 is a perspective view of the keyboard instrument in use, showing an example in which the keyboard cover is removed from the keyboard instrument shown in FIG. 2 to be turned into the stored/saved state.

FIG. 1 is a perspective view of the keyboard cover in the present embodiment. FIG. 2 is a perspective view of a keyboard instrument in a keyboard protecting state having the instrument upper surface covered with the keyboard cover shown in FIG. 1. FIG. 3 is a perspective view of the keyboard instrument in use, in which the keyboard cover is removed from instrument body of the keyboard instrument shown in FIG. 2 to be turned into the stored/saved state.

In the following embodiments, the left and right and front and rear refer to the directions shown in FIG. 1, FIG. 2, and the like. The up and down refer to the directions shown in FIG. 2 and the like.

A keyboard cover 1 shown in FIG. 1 and the like covers the upper surface of an instrument body 3 including a keyboard 31 (see FIG. 3 and the like) of a keyboard instrument (a keyboard instrument 2 in FIG. 2 and the like which is an electronic musical instrument in the present embodiment) to protect the keyboard 31 and the like from dust and the like.

[Configuration of Keyboard Instrument]

The keyboard instrument 2 to which the keyboard cover 1 is applied includes the instrument body 3 as shown in FIGS. 2 and 3 and legs 4 for supporting the instrument body 3.

The instrument body 3 includes, for example, as shown in FIG. 3, the keyboard 31 configured with a plurality of keys (white and black keys) 311, and a housing 32 for housing the keyboard 31.

Of the housing 32, on each side in the longitudinal direction (left and right direction) of the keyboard 31, a sleeve 321 is provided. A portion of the front side of the keyboard 31 is covered with a key slip 322.

On at least one side of the instrument body 3, at least one of an operator and a display unit not covered with the keyboard cover 1 in the keyboard protecting state is arranged. In this embodiment, on the upper surface of the sleeve 321 on the left side of the keyboard 31, various operator 324, display unit 325 and the like are provided.

The operator 324 is intended for user input of various instructions, and includes, for example, a pitchbend wheel, a modulation wheel, a slider bar, a joystick, a switch button, or the like. The display unit 325 includes various display devices (indicators, lamps, liquid crystal panels, and the like) indicating the state of the keyboard instrument 2, and the like. The illustrated operator 324 and the display unit 325 are examples, and the shapes and arrangements thereof are not limited to the illustrated examples.

The keyboard instrument 2 of the present embodiment, even when not used as a keyboard instrument, is able to acquire sound data (music data) from various devices including a mobile terminal such as a smartphone connected by various wireless communication such as Bluetooth (registered trademark) and Wi-Fi and plays it to emit sound.

The operator 324 and the display unit (indicator, or the like) 325 receives various operation input instructions and displays the playback status during the audio playback operation. For example, the display unit 325 lights in a predetermined color during audio playback operation. The portion to light is not limited to the display unit 325. For example, periphery of the operator 324 or the like may light. The display unit 325 may display various information such as the song name of the music being played, for example. The acquisition of the data in the keyboard instrument 2 is not limited to the wireless manner. The data may be acquired by a wired connection.

Figure 4:
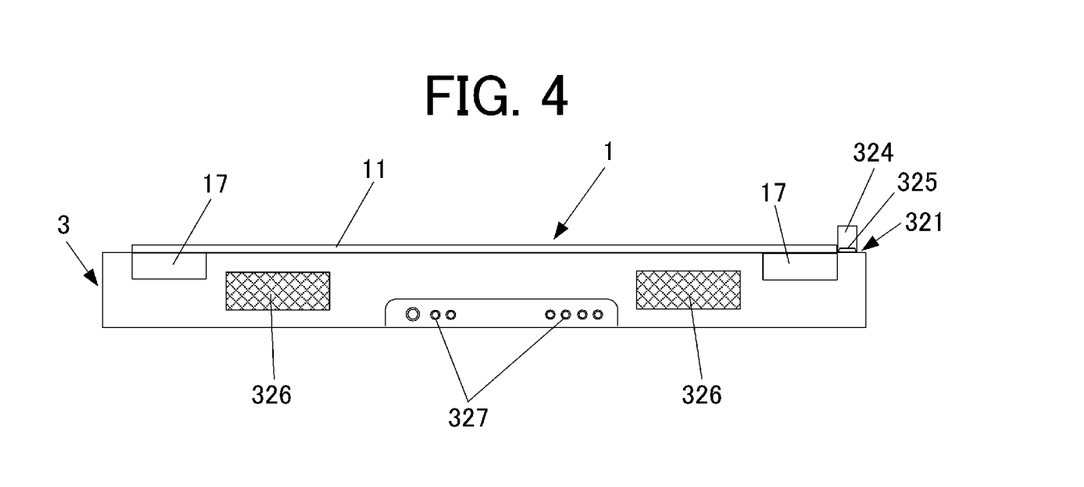
FIG. 4 is a plan view showing a configuration example of the rear surface of the keyboard instrument having the instrument body covered with the keyboard cover of the present embodiment.

FIG. 4 is a rear view of an example of the instrument body viewed from the rear side of the keyboard instrument.

As shown in FIG. 4, on the rear surface of the instrument body 3, an audio output unit (sound emitters 326 such as speakers) which outputs (emits) sound, connectors 327 which can be connected to various terminals, and the like are provided.

The sound emitter 326 outputs sound based on the key operation by the user when the key instrument 2 is played. In the present embodiment, even when the keyboard instrument 2 is not used as the keyboard instrument as mentioned above, the sound emitter 326 can function as a speaker which outputs sound or the like based on the sound data (music data) acquired from external various devices. Also in this case, the sound emitter 326 is caused to output sound.

The layout and the like of the rear surface of the instrument body 3 are not limited to the illustrated examples. For example, although not shown, the rear surface of the instrument body 3 is provided with a mounting portion for fixing the legs of the music stand. When the keyboard instrument 2 is played, it is possible to attach and use the music stand.

As will be described later, the legs 4 of the keyboard instrument 2 are provided with a hook 41 for hooking the keyboard cover 1 which is folded into a storable state (see FIG. 2 and the like) is provided.

The hook 41, as described later, enables hooking the keyboard cover 1 to be turned into the stored/saved state when the keyboard is used. The keyboard cover 1 is configured to be in the keyboard protecting state of protecting the keyboard 31 when the keyboard 31 is not used, and to be in the storable state in which the keyboard cover 1 is removed from above the keyboard 31 to expose the keyboard 31 and is folded when the keyboard is used.

As described later, the keyboard cover 1 includes a handle 14 which turns the keyboard cover 1 into a storable state by maintaining a folded state (third folded state to be described later) in which the keyboard cover 1 is folded to be compact. The hook 41 is used to hook the handle 14 of the keyboard cover 1 which is in the storable state.

Though the position and the shape of the hook are not particularly limited, the hook is arranged at such a position that the keyboard cover 1 hooked to the hook 41 does not disturb the user during performance using the keyboard 31.

In the present embodiment, a reinforcing member 42 is attached to each of the left and right legs 4 to increase the strength of the legs 4. The hook 41 is attached to this reinforcing ember 42.

The hook 41 is attached by, for example, a double-sided tape or a screw, and it may be possible for the user to adjust the mounting position in accordance with the user's usability.

Although the other detailed description is omitted, the keyboard instrument 2 is provided with a pedal unit and a removable music stand described above (not shown) and the like.

As described above, the keyboard instrument 2 of the present embodiment is an electronic keyboard instrument which is an electronic instrument and incorporates a controller or the like (not shown) for controlling the operation of each part of the keyboard instrument 2 in an integrated manner.

[Configuration of Keyboard Cover]

As shown in FIG. 1, the keyboard cover 1 in the present embodiment includes: an upper surface cover 11 which covers the upper surface of the instrument body 3 including the keyboard 31 of the keyboard instrument 2; and a front hanging portion 12 which is provided at the front end of the upper surface cover 11 so as to be able to hang down to cover the front end surface of the keyboard 31 in the keyboard protecting state.

The upper surface cover 11 and the front hanging portion 12 are both formed of a fabric having a certain tension, such as thick felt, for example, and foldable in at least the longitudinal direction (longitudinal direction of the instrument body 3 including the keyboard 31, left and right direction). The upper surface cover 11 and the front hanging portion 12 may be formed of a same material or may be formed of different materials. In the present embodiment, an example of the case where the front hanging portion 12 is formed of the fabric continuous to the upper surface cover 11 as one piece. However, the upper surface cover 11 and the front hanging portion 12 may be formed of fabrics as separate parts, which may be combined by stitching or the like.

Locking pieces 17 are provided at the rear end of the upper surface cover 11 so as to be able to hang down on the rear side (rear end side) of the instrument body 3 in the keyboard protecting state.

The upper surface cover 11 extends in the longitudinal direction (left and right direction in FIG. 1) of the instrument body 3 and covers the entire keyboard 31 and at least part of the sleeves 321 arranged on left and right sides of the keyboard 31. In a state in which the upper surface cover 11 covers the upper surface of the instrument body 3 including the keyboard 31 of the keyboard instrument 2, the upper surface is referred to as a front surface of the upper surface cover 11, and the surface facing the keyboard 31 and the like of the keyboard instrument 2 is referred to as a back surface of the upper surface cover 11.

In the present embodiment, on the upper surface of the sleeve 321 on the left side of the keyboard 31, the various operator 324, display unit 325 and the like are provided as mentioned above, and the upper surface cover 11 does not cover them (see FIGS. 2 and 3). The upper surface cover 11 may be positioned by abutting the operator 324, display unit 325, or the like. The right side of the upper surface cover 11 may be the same as or slightly longer than the right end of the instrument body 3, but in the illustrated example, the upper surface cover 11 has such a length that the left and right sleeves 321 are exposed to a same degree from the viewpoint of design (see FIG. 2 and the like).

The length in the short direction of the upper surface cover 11 (front and rear direction in FIG. 1) is substantially equal to the length in the depth direction of the instrument body 3.

A first indicator 15 indicating the central position in the longitudinal direction (left and right direction) of the upper surface cover 11 is provided in at least the center in the longitudinal direction (left and right direction) at the front end of the upper surface cover 11. A pair of second indicators 16 which are a guide to the folding position are provided respectively on the left and right sides of the first indicator 15.

The first indicator 15 and the second indicators 16 are composed of, for example, embroidery. The first indicator 15 and the second indicators 16 are preferably of different colors so as to be easily distinguished. The first indicator 15 and second indicators 16 may have a function as a decoration, and the color preferably fits the overall color tone of the keyboard cover 1.

Each of the second indicators 16 forming a pair is arranged at a position apart by a predetermined distance d on the left and right of the first indicator 15. The details of the positional relationship of the first indicator 15 and the second indicators 16 will be described later.

The front hanging portion 12 has the length in the longitudinal direction (left and right direction in FIG. 1) substantially matching the length in the longitudinal direction (left and right direction) of the upper surface cover 11. The length in the short direction of the front hanging portion 12 is a length that can cover at least the front end surface of the keyboard 31 when the front hanging portion 12 is hung down on the front side of the instrument body 3 with the keyboard cover 1 in the keyboard protecting state.

In the present embodiment, as shown in FIG. 2 and the like, the front hanging portion 12 has the length equal to or slightly longer than the length to the lower end of the key slip 322 of the instrument body 3 when the front hanging portion 3 is hung down. The length of the front hanging portion 12 when hung down is not particularly limited but may be longer than the illustrated example. However, the length longer than necessary is not preferable since the weight increases and the keyboard cover 1 becomes difficult to handle. The front hanging portion 12 may be shorter than the illustrated example. The front hanging portion 12 may have any length as long as it can cover at least the front side surface of the keyboard 31, and it is not essential to cover the entire key slip 322.

As shown in FIGS. 1 and 2, on the front surface of the front hanging portion 12, a handle 14 is provided so as to extend in the longitudinal direction (left and right direction) of the instrument body 3.

The handle 14 turns the keyboard cover 1 into a storable state by maintaining the folded state of the keyboard cover 1 which is folded to be compact.

When the keyboard is used, the handle 14 turns the keyboard cover which is folded to be compact to be in the storable state into the stored/saved state in which the keyboard cover 1 is hooked to the hook 41 of the keyboard instrument 2 with the handle 14. Thus, the handle 14 has a strength to at least such a degree that the entire keyboard cover 1 can be hung down with only the handle 14. The handle 14 is also able to be bent to be deformed, and for example, formed of leather or synthetic leather having a certain strength and flexibility.

The handle 14 is located at substantially the central position in the up and down direction of the front hanging portion 12, and located such that its center in the longitudinal direction substantially matches the center (same as the center in the longitudinal direction of the upper surface cover 11) in the longitudinal direction (left and right direction) of the front hanging portion 12.

It is preferable that the logo of the product or various decorations are applied to the front surface of the handle 14.

Although the method of attaching the handle 14 is not particularly limited, in the present embodiment, both ends of the handle 14 are attached to the front hanging portion 12 by set screws 141 inserted into the front and back of the front hanging portion 12, and the handle 14 is rotatable about the centers of the set screws 141.

At the positions corresponding to the set screws 141 on the back surface of the front hanging portion 12, a covering cloth or the like (not shown) is provided, so as to prevent the set screws 141 from damaging the surface by contacting the instrument body 3 directly.

The handle 14 is configured such that both ends attached to the front hanging portion 12 with the set screws 141 are respectively arranged on the front and back of the entire keyboard cover 1 which is made compact in the folded state of the keyboard cover 1 described later (see FIGS. 14 to 16).

As shown in FIG. 1 and the like, the locking pieces 17 in the present embodiment are arranged on respective end sides in the longitudinal direction (left and right direction, arrangement direction of keys 311) of the upper surface cover 11 at the rear end of the upper surface cover 11.

The locking piece 17 has a strength to some extent, and for example, formed of leather or synthetic leather. The material of the locking piece 17 is not limited to this.

The keyboard cover 1 in the present embodiment is folded in the longitudinal direction to be compact as described later. If the locking piece 17 having a high strength is bent along with the upper surface cover 11 at the time of folding, it is difficult to smoothly fold the entire keyboard cover 1. Thus, it is preferable to provide the locking pieces 17 at the positions or in the range that are not across the portions to be folded (portions where the folding lines are to be formed) at the time of folding.

Though the shape, size and the like of the locking piece 17 is not limited to the illustrated examples, the audio output unit (sound emitters 326 such as speakers) which outputs (emits) sound, connectors 327 which can be connected to various terminals, and the like are provided on the rear surface of the instrument body 3 (see FIG. 4), as mentioned above. Thus, the locking piece 17 is preferably of a shape and a size such that the locking piece 17 does not cover the sound emitter 326 or the like even when it is hung down on the rear surface of the instrument body 3 in the keyboard protecting state.

The front hanging portion 12 and the locking pieces 17 are provided to be in the folded-in state overlapping with the back surface of the upper surface cover 11 in the normal state.

Figure 5:
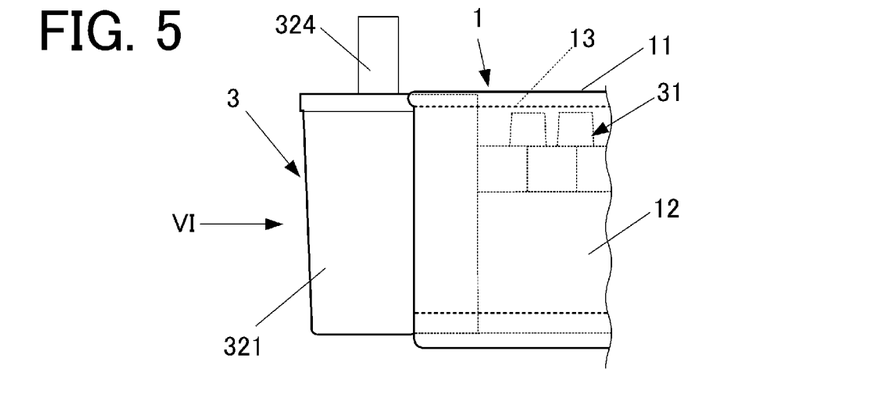
FIG. 5 is an enlarged view of the left side of the instrument body when the upper surface of the instrument body covered with the keyboard cover is viewed from the front.
Figure 6:
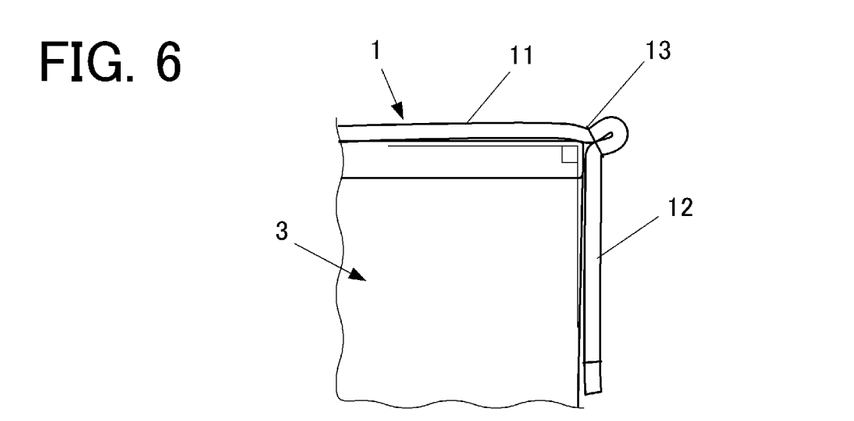
FIG. 6 is a side view of the instrument body viewed from the arrow VI direction in FIG. 5.

FIG. 5 is an enlarged view of the left side of the instrument body when the upper surface of the instrument body covered with the keyboard cover is viewed from the front. FIG. 6 is a side view of the keyboard instrument viewed from the arrow VI direction in FIG. 5.

As shown in FIGS. 5 and 6, for example, at the front end of the upper surface cover 11 at which the front hanging portion 12 is provided, a stitch portion 13 is provided so as to pinch the end portion of the upper surface cover 11 along the longitudinal direction (left and right direction). The front hanging portion 12 is connected to the upper surface cover 11 via the stitch portion 13.

Thus, the front hanging portion 12, in the normal state of not being abutted against the upper surface front end portion or the like of the instrument body 3, collapses so as to overlap with the back surface of the upper surface cover 11.

Further, as shown in FIG. 6, when abutted against the upper surface front end portion of the instrument body 3, the front hanging portion 12 hangs down in a state substantially perpendicular to the upper surface cover 11 along the shape of the upper surface front end portion of the instrument body 3 (the upper surface front end portion of the sleeve 321).

Figure 7:
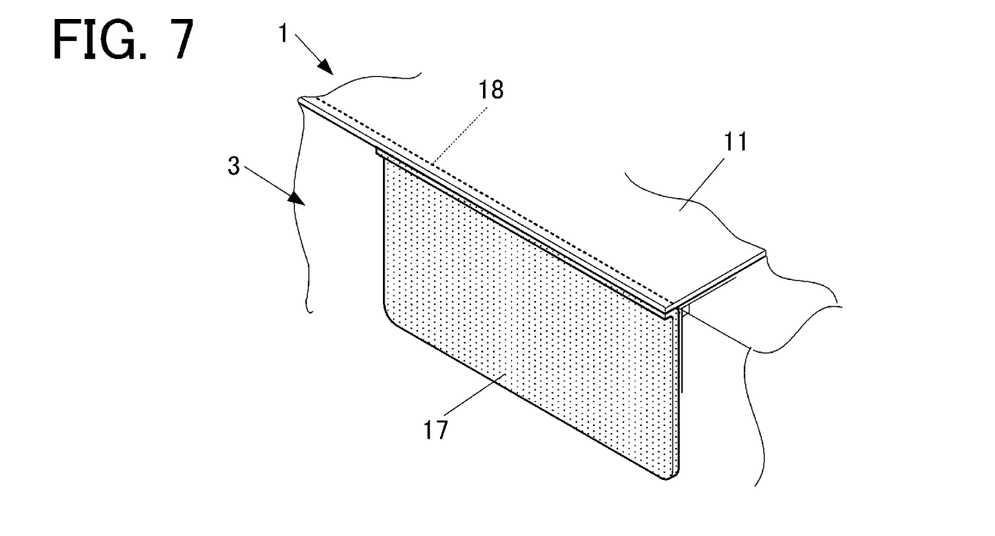
FIG. 7 is an enlarged view of the upper surface of the instrument body covered with the keyboard cover viewed diagonally from behind.

FIG. 7 is an enlarged view of the upper surface of the instrument body covered with the keyboard cover viewed diagonally from behind.

As shown in FIGS. 1 and 7, a stitch portion 18 is provided along the longitudinal direction (left and right direction) at the rear end of the upper surface cover 11, and on both ends in the longitudinal direction (left and right direction) at the rear end of the upper surface cover 11, the locking pieces 17 which are arranged so as to overlap with the back surface of the upper surface cover 11 are respectively attached by being sewn to the upper surface cover 11 with the stitch portion 18.

Thus, the locking pieces 17, in the normal state of not being abutted against the upper surface front end portion or the like of the instrument body 3, collapse so as to overlap with the back surface of the upper surface cover 11.

Further, as shown in FIG. 7, when abutted against the upper surface front end portion of the instrument body 3, the locking pieces 17 hang down in a state substantially perpendicular to the upper surface cover 11 along the shape of the upper surface rear end portion of the instrument body 3 (the upper surface rear end portion of the sleeve 321).

As mentioned above, the length in the short direction (front and rear direction) of the upper surface cover 11 is substantially equal to the length in the depth direction of the instrument body 3. Thus, in the keyboard protecting state of laying the keyboard cover 1 over the upper surface of the instrument body 3 as shown in FIG. 2, the front hanging portion 12 provided on the front end side of the upper surface cover 11 and the locking pieces 17 provided on the rear end side are respectively hooked to the front end side and the rear end side of the instrument body 3 and hung down substantially perpendicular to the upper surface cover 11 (see FIGS. 6 and 7).

At this time, since the front hanging portion 12 and the locking pieces 17 try to return to the normal state of overlapping with the back surface of the upper surface cover 11, the front hanging portion 12 and the locking pieces 17 hold the instrument body 3 so as to sandwich the instrument body 3 from front and rear side. Therefore, for example, it is possible to fix the keyboard cover 1 firmly to the instrument body 3 without providing a fixing device or anti-slip device such as a surface fastener or a button for fixing the keyboard cover 1 to the instrument body 3.

[Storing Method of Keyboard Cover]

Next, the storing method of the keyboard cover 1 will be described with reference to FIGS. 8 to 17.

First, when the keyboard 31 of the keyboard instrument 2 is not used (when the user does not perform performance using the keyboard instrument 2), as shown in FIG. 2, the keyboard instrument 2 is covered with the keyboard cover 1 into the keyboard protecting state of protecting the keyboard 31 and the like from dust and the like.

When the keyboard cover 1 is attached to the instrument body 3 of the keyboard instrument 2 into the keyboard protecting state, for example, the locking pieces 17 provided at both ends in the longitudinal direction (left and right direction) of the rear end portion of the instrument body 3 in the upper surface cover 11 are hooked to the corner of the rear end side of the instrument body 3, and the front hanging portion 12 is pulled toward the front of the instrument body 3 by holding the handle 14.

Thus, the locking pieces 17 are opened at an angle of substantially 90 degrees with respect to the upper surface cover 11 (see FIG. 7, and the like), hanging along the corner of the rear end side of the instrument body 3. The upper surface of the instrument body 3 including the keyboard 31 is covered with the upper surface cover 11 of the keyboard cover 1.

Furthermore, the front hanging portion 12 provided at the front end in the upper surface cover 11 is hooked to the corner of the front end side of the instrument body 3, thereby opened at an angle of substantially 90 degrees with respect to the upper surface cover 11 (see FIG. 6, and the like), and hangs down along the corner of the front end side of the instrument body 3, covering the front end surface and the like of the keyboard 31.

In this state, the handle 14 attached to the front hanging portion 12 is located at a position which is on the front surface of the front hanging portion 12 and on the front surface side of the keyboard instrument 2 (see FIG. 2).

As mentioned above, the front hanging portion 12 and the locking pieces 17 try to collapse onto the back surface side of the upper surface cover 11. Thus, the keyboard cover 1 sandwiches the instrument body 3 from front and behind with the front hanging portion 12 and the locking pieces 17, so that the keyboard cover 1 is hardly displaced or unlocked.

Even in the keyboard protecting state in which the keyboard instrument 2 is covered with the keyboard cover 1, as mentioned above, the sound emitters 326 and various connectors 327 arranged on the rear surface of the instrument body 3 are not covered with the locking pieces 17 or the like of the keyboard cover 1 (see FIG. 4). In addition, the width in the longitudinal direction (left and right direction) of the upper surface cover 11 is of such a dimension that does not cover the operator 324 or the display unit 325 provided on the upper surface of the instrument body 3 (in the present embodiment, the upper surface of the sleeve 321 on the left side, see FIGS. 2 and 3, and the like). Therefore, even in the keyboard protecting state, the operator 324 and the display unit 325 are exposed from the keyboard cover 1 (upper surface cover 11 of the keyboard cover 1) (see FIG. 2, and the like), it is possible to visually recognize the display unit 325, and it is possible to perform the operation of the operator 324 and the like.

When the keyboard cover 1 is removed from the instrument body 3 of the keyboard instrument 2 from the keyboard protecting state shown in FIG. 2, the folded state in which the upper surface cover 11 and the front hanging portion 12 including the handle 14 are folded in the longitudinal direction and folded to be compact is maintained by the handle 14, which is the storable state.

Figure 8:
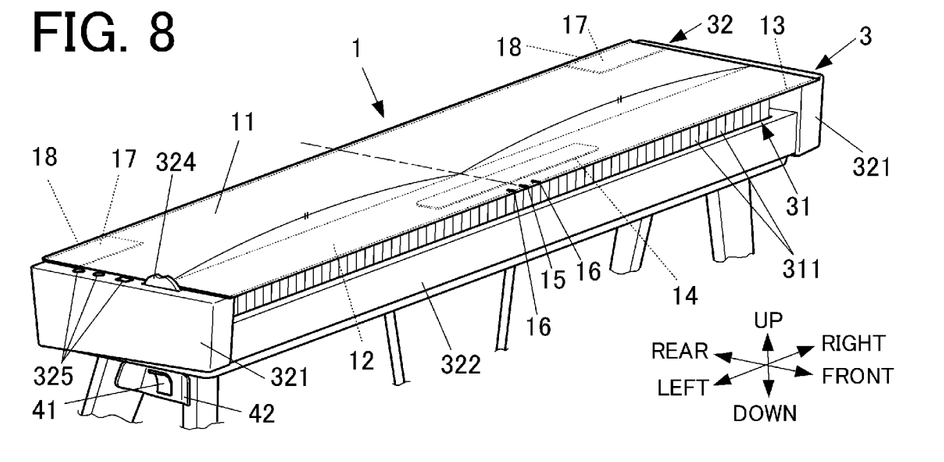
FIG. 8 is a main part perspective view of the keyboard instrument which has the keyboard cover turned into a folded-in state from the state shown in FIG. 2.

To be specific, as shown in FIG. 8, the front hanging portion 12 including the handle 14 and the locking pieces 17 are first folded into the folded-in state so as to overlap with the back surface side of the upper surface cover 11. In the present embodiment, as mentioned above, the front hanging portion 12 and the locking pieces 17 try to return to the normal state of overlapping with the back surface of the upper surface cover 11. Thus, it is possible to easily turn the front hanging portion and the locking pieces 17 into the folded-in state by releasing the state in which the front hanging portion 12 is hooked to the corner of the front end side of the instrument body 3 and releasing the state in which the locking pieces 17 are hooked to the corner of the rear end side of the instrument body 3.

By turning the front hanging portion 12 and the locking pieces 17 into the folded-in state, the keyboard cover 1 is a substantially flat plate having a size equal to that of the upper surface cover 11. FIG. 8 and the like show the portion not actually visible due to the folding-in to the back surface, with the broken line.

Next, from the state shown in FIG. 8, both ends in the longitudinal direction of the upper surface cover 11 and the front hanging portion 12 (including the handle 14) are folded toward the center in the longitudinal direction, thereby turning the keyboard cover 1 into the first folded state.

Figure 9:
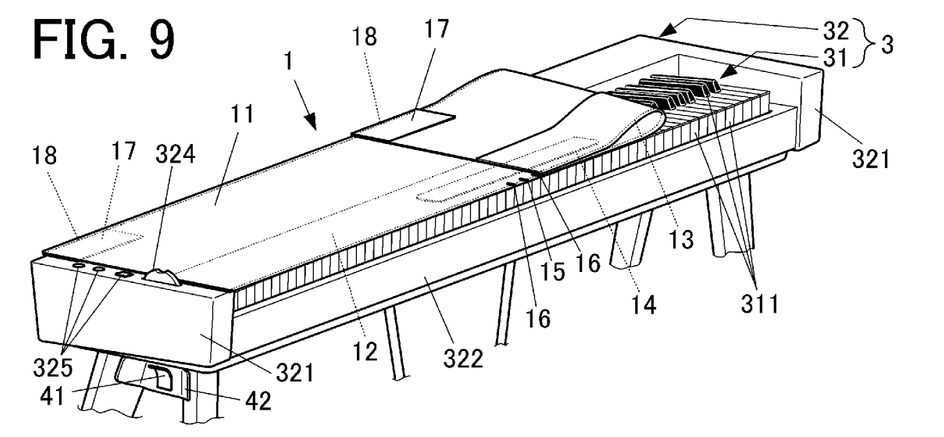
FIG. 9 is a main part perspective view of the keyboard instrument which has the right side of the keyboard cover turned into a state of being folded toward the center from the state shown in FIG. 8.
Figure 10:
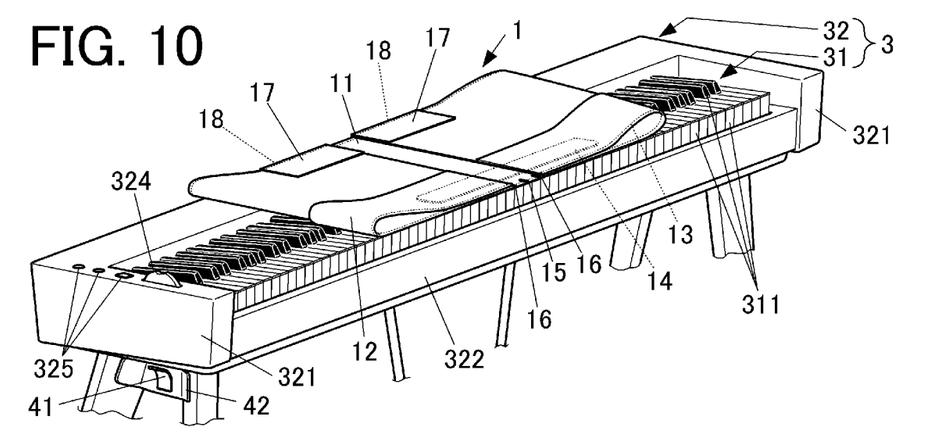
FIG. 10 is a main part perspective view of the keyboard instrument which has the left side of the keyboard cover being folded toward the center from the state shown in FIG. 9 and turned into a first folded state.

FIG. 9 is a view showing the state in which the right side of the keyboard cover 1 is folded, and FIG. 10 is a view showing the state in which the left side of the keyboard cover 1 is also folded from the state shown in FIG. 9. That is, FIG. 10 shows the first folded state in which each of both ends of the keyboard cover 1 is folded once.

When both ends in the longitudinal direction of the upper surface cover 11 and the front hanging portion 12 are folded toward the center in the longitudinal direction, as shown in FIGS. 9 and 10, the end portions in the longitudinal direction of the upper surface cover 11 and the front hanging portion 12 are made aligned with the respective positions of the second indicators 16 provided on the upper surface cover 11. Thus, it is possible to align the left and right folding amount to be substantially equal in the longitudinal direction of the upper surface cover 11 and the front hanging portion 12.

When the keyboard cover 1 is turned to the first folded state shown in FIG. 10, the portions which are both end portions in the longitudinal direction of the upper surface cover 11 and the front hanging portion 12 in the first folded state shown in FIG. 10 are further folded toward the center in the longitudinal direction. Thus, the keyboard cover 1 is turned into the second folded state shown in FIG. 11.

Also at this time, the end portions in the longitudinal direction of the upper surface cover 11 and the front hanging portion 12 are made aligned with the respective positions of the second indicators 16 provided on the upper surface cover 11. Thus, it is possible to align the left and right folding amount to be substantially equal in the longitudinal direction of the upper surface cover 11 and the front hanging portion 12.

Figure 11:
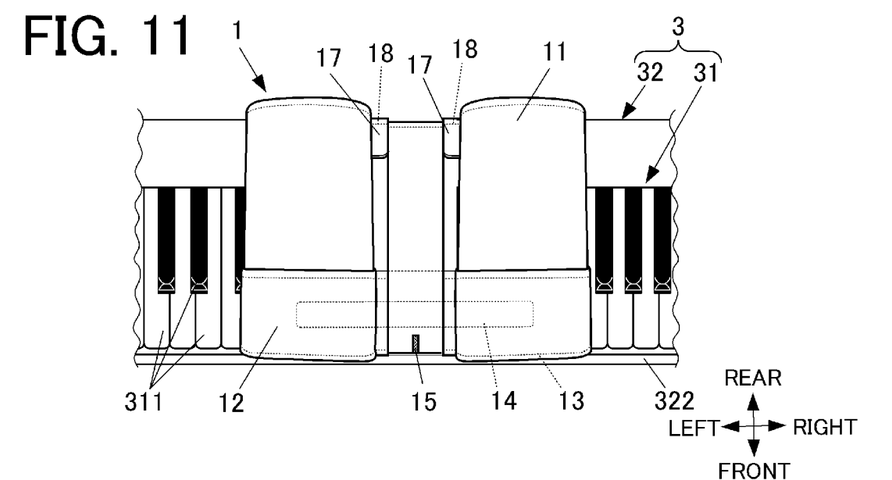
FIG. 11 is a main part perspective view of the keyboard instrument which has the left and right sides of the keyboard cover further folded toward the center from the state shown in FIG. 10 and turned into a second folded state.

When the keyboard cover 1 is turned into the second folded state shown in FIG. 11, the entire keyboard cover 1 is further folded in half so that both end portions in the longitudinal direction of the upper surface cover 11 and the front hanging portion 12 in the second folded state overlap with each other. Thus, the keyboard cover 1 goes to the third folded state (see FIG. 14).

Figure 14:
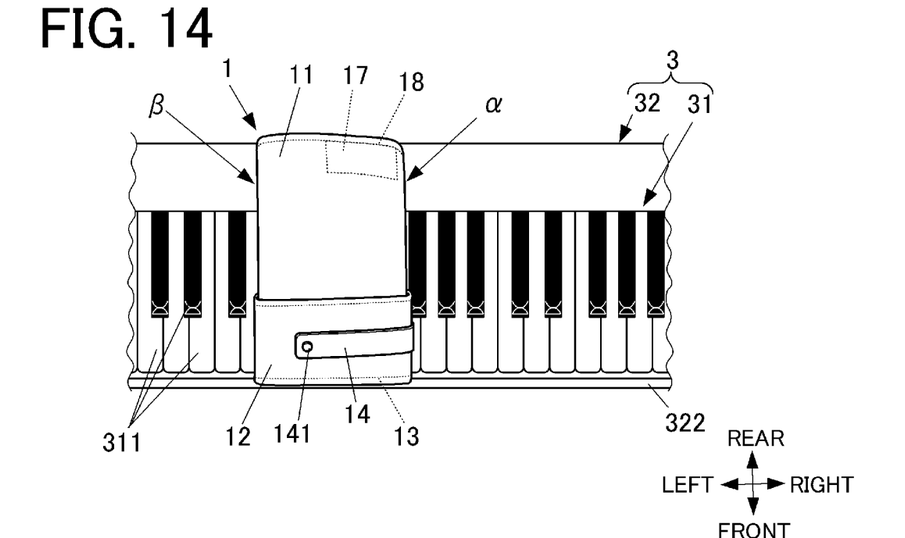
FIG. 14 is a main part upper view of the keyboard instrument which has the keyboard cover shown in FIG. 11 being folded to the state shown in FIG. 13 and turned into a third folded state.
Figure 15:
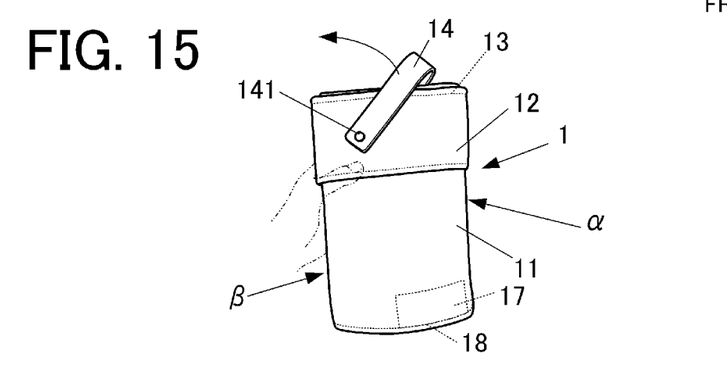
FIG. 15 is an explanatory view showing a state of raising a handle by holding, with a hand, the keyboard cover in the state shown in FIG. 14.
Figure 16:
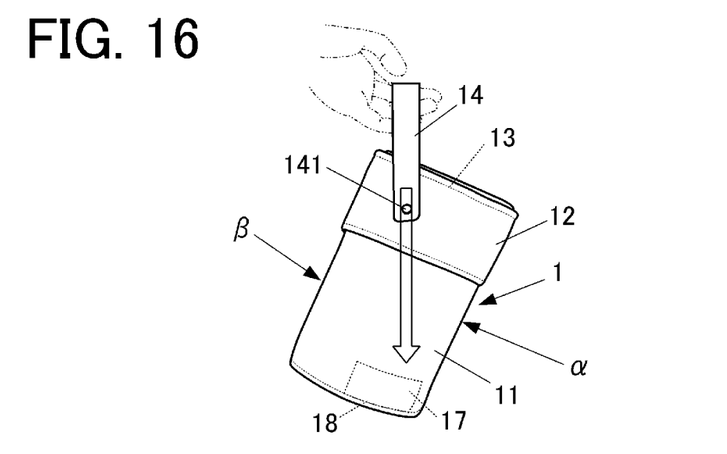
FIG. 16 is an explanatory view showing a state of suspending the handle of the keyboard cover in the state shown in FIG. 15 by holding the handle with a hand.

In FIG. 14 and the like, as for the center in the longitudinal direction of the upper surface cover 11 and the front hanging portion 12 before the keyboard cover 1 is turned into the third folded state, the outer side when folded into the third folded state is referred to as the spine side α, and the portion overlapped when the keyboard cover 1 is turned into the third folded state from the second folded state is referred to as the overlapping side β (see FIGS. 14 to 16).

Figure 12:
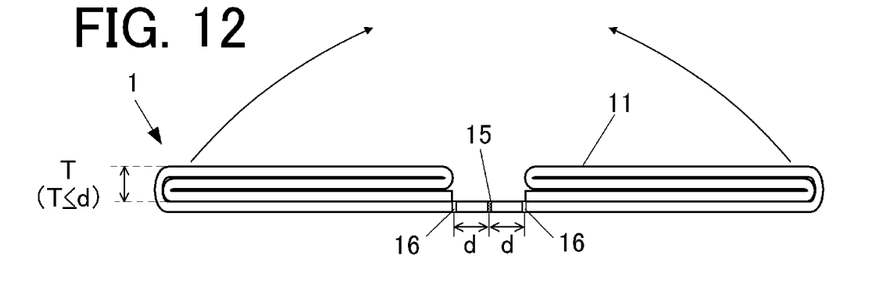
FIG. 12 is a schematic diagram schematically showing the folded state of the keyboard cover in the state shown in FIG. 11.
Figure 13:
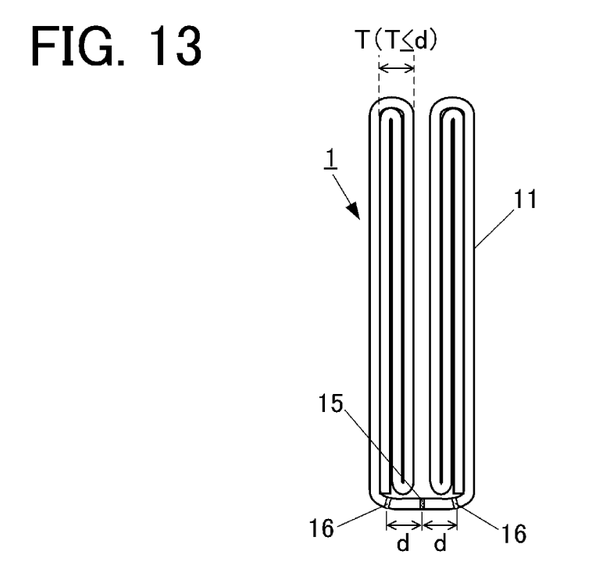
FIG. 13 is a schematic diagram schematically showing the state in which the keyboard cover in the state shown in FIG. 12 is folded in half at the central position.

FIG. 12 is an explanatory view schematically showing the keyboard cover in the second folded state. FIG. 13 is an explanatory view schematically showing the keyboard cover in the third folded state.

As shown in FIGS. 12 and 13, each of the second indicators 16 forming a pair is apart by a predetermined distance d on the left and right of the first indicator 15 indicating the central position in the longitudinal direction of the upper surface cover 11.

The degree of the predetermined distance d depends on the thickness or the like of the fabric forming the keyboard cover 1. That is, the predetermined distance d is set to be equal to or greater (T≤d) than the thickness (thickness T in FIGS. 12 and 13) of the layers folded on the bottom layer which is the base in the second folded state (see FIGS. 11 and 12) in the folded keyboard cover 1 as shown in FIG. 12.

For convenience, FIGS. 12 and 13 illustrate only the overlap of the upper surface cover 11 in the keyboard cover 1, but actually the front hanging portion 12 overlaps over the entire longitudinal direction on the front end side of the upper surface cover 11 (see FIG. 11). Therefore, in the portion where the front hanging portion 12 is overlapping, the thickness T also becomes thicker according to the thickness of the fabric.

The predetermined distance d being equal to or greater than the thickness T (T≤d) enables to smoothly make the folded state in which the entire keyboard cover 1 is compact without the fabric being pulled forcibly or wrinkled when the keyboard cover 1 is turned into the third folded state shown in FIGS. 13 and 14.

The handle 14 is located such that the center thereof is at the position substantially matching the center in the longitudinal direction of the upper surface cover 11 as mentioned above. In the normal state, the handle 14 is parallel to the longitudinal direction of the front hanging portion 12. The handle 14 has a length to the degree staying on the back surface side of the upper surface cover 11 (that is, not wrapped around to the surface on the upper side in FIG. 11) in the second folded state shown in FIG. 11.

When the keyboard cover 1 is turned into the third folded state shown in FIG. 14, the handle 14 is also bent in two in the longitudinal direction, having both ends respectively arranged on the front and back sides of the entire keyboard cover 1 which is made compact in the folded state (third folded state).

When the entire keyboard cover 1 becomes compact, the handle 14 is rotated to be raised outward from the state of being parallel to the longitudinal direction of the front hanging portion 12 (see FIG. 15). That is, in the present embodiment, the handle 14 is rotated about the axis center of each of the set screws 141 fixing the handle 14. At this time, as shown by the arrow in FIG. 15, the handle 14 is pulled to stand from the spine side α to the overlapping side β. By suspending the entire keyboard cover 1 with the handle 14 positioned outside, the folded state is maintained (see FIG. 16).

That is, when the keyboard cover 1 is suspended by holding in hand the handle 14 raised outward, the entire keyboard cover 1 is pulled in the gravity direction indicated by the white arrow in FIG. 16 by its own weight. Furthermore, in the present embodiment, as shown in FIG. 16, the locking pieces 17 are located substantially in the lower side of the gravity direction (direction indicated by the white arrow in FIG. 16) of the handle 14. Thus, the entire keyboard cover 1 is pulled down in the gravity direction indicated by the white arrow more reliably.

Thus, the portion (overlapping side overlapped when the keyboard cover 1 is turned into the third folded state from the second folded state is held in the narrowing direction by the handle 14 locked to the front and back sides of the keyboard cover 1 which was made compact, turning the keyboard cover 1 into the storable state in which the folded state (third folded state) is maintained (see FIG. 16).

In this way, in the present embodiment, the entire keyboard cover 1 is suspended by the handle 14 in the storable state (see FIG. 16), and thus the overlapping side β is held not to be open by the handle 14. Thus, the positions of both ends of the handle 14 located on the front and back surfaces of the keyboard cover 1 in the third folded state (that is, positions of the set screws 141 fixing the handle 14 to the front hanging portion 12) are the positions closer to the overlapping side β (left side in FIGS. 15 and 16) than the center of the left and right direction of the keyboard cover 1 which is made compact in FIGS. 14, 15 and the like.

The specific positions of both ends of the handle 14 (positions of the set screws 141) are appropriately set so as to suspend in a balanced manner the keyboard cover 1 when it is suspended with the handle 14.

In the present embodiment, as shown in FIG. 3 and the like, the keyboard cover 1 is turned into the stored/saved sate by hooking the keyboard cover 1 in the storable state (see FIG. 16) to the hook 41 of the keyboard instrument 2 with the handle 14.

Figure 17:
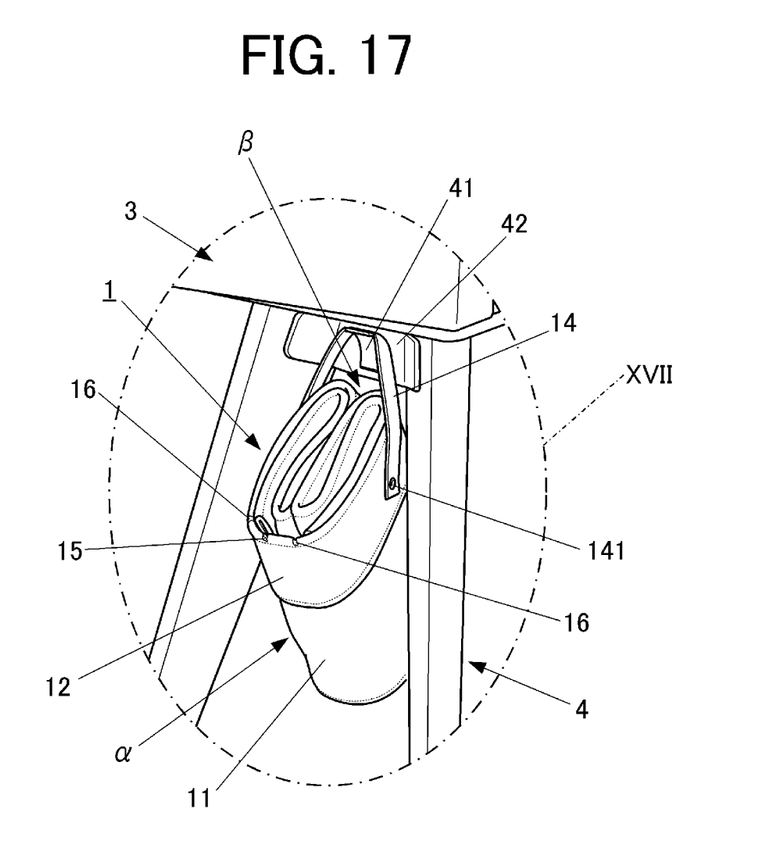
FIG. 17 is a main part enlarged perspective view of the XVII portion in FIG. 3.

FIG. 17 is an enlarged perspective view of a portion XVII shown surrounded by a chain line in FIG. 3.

FIG. 17 shows a case where the keyboard cover 1 is hooked so that the overlapping side β is inward (inside of the keyboard instrument 2, back side) when the handle 14 is hooked to the hook 41.

In this way, by folding the keyboard cover 1 and hooking the keyboard cover 1 to the keyboard instrument 2 while maintaining the folded state (third folded state), it is possible to immediately shift to the keyboard use operation such as playing operation without securing a separate location to place the keyboard cover 1.

As described above, according to the present embodiment, the keyboard cover 1 includes: the upper surface cover 11 which covers the upper surface of the instrument body 3 including the keyboard 31 in the keyboard protecting state; the front hanging portion 12 which is provided at the front end of the upper surface cover 11 so as to be in the folded-in state of overlapping with the back surface of the upper surface cover 11 in the normal state, and which is able to hang down so as to cover the front end surface of the keyboard 31 in the keyboard protecting state; the handle 14 which is provided on the front surface of the front hanging portion 12 so as to extend in the longitudinal direction (left and right direction) of the instrument body 3 and which is able to be bent to be deformed; and the locking pieces 17 which are provided at the rear end of the upper surface cover 11 so as to be in the folded-in state of overlapping with the back surface of the upper surface cover 11 in the normal state and which are able to hang down on the rear end of the instrument body 3 in the keyboard protecting state. When the keyboard is used, the upper surface cover 11 and the front hanging portion 12 including the handle 14 in the folded-in state can be folded in the longitudinal direction, and the folded state in which the keyboard cover 1 is folded to be compact is maintained by the handle 14, turning the keyboard cover 1 into the storable state.

Thus, in the keyboard protecting state, the upper surface of the instrument body 3 can be covered with the upper surface cover 11, the front side of the keyboard can be covered with the front hanging portion 12, and thus it is possible to protect the keyboard 31 and the like from dust and the like. Especially when the keyboard instrument 2 is an electronic musical instrument as in the present embodiment, if dust or the like enters the inside of the instrument body 3, there is a risk of causing defects such as a failure of the electrical system. In this respect, by using the keyboard cover 1 of the present embodiment, the dust or the like can be prevented from entering the instrument body 3, and thus it is possible to prevent such defects.

In addition, by the configuration of holding the instrument body 3 from front and rear sides with the front hanging portion 12 and the locking pieces 17, it is possible to prevent the keyboard cover 1 from being unlocked or displaced from the instrument body 3 without being fixed by a surface fastener or a button or the like, for example.

Furthermore, the locking pieces 17 and the front hanging portion 12 are attached so as to be in the folded-in state of overlapping with the back surface of the upper surface cover 11 in the normal state. Thus, when the keyboard cover 1 is removed, by merely releasing the hooking of the locking pieces 17 and the front hanging portion 12 to the corner of the instrument body 3, the locking pieces 17 and the front hanging portion 12 can easily and promptly overlap with the back surface of the upper surface cover 11 to become easy to fold.

In the present embodiment, the handle 14 has its center located at the position substantially matching the center in the longitudinal direction of the upper surface cover 11. Both ends of the handle 14 are respectively arranged on the front and back sides of the entire cover (keyboard cover 1) which is made compact in the folded state (in the present embodiment, the third folded state shown in FIG. 14 and the like).

Thus, when the handle 14 is pulled out outward (see FIGS. 15 and 16), it is possible to sandwich the entire keyboard cover 1 from front and back sides by the handle 14. Therefore, it is possible to prevent the folded state being collapsed and spreading the keyboard cover 1 and maintain the folded state (in the present embodiment, the third folded state shown in FIG. 14 and the like) without using a string or the like separately.

In the present embodiment, the handle 14 has its both ends attached to the front hanging portion 12 so as to be rotatable about the screw centers with the set screws 141 inserted into the front and back of the front hanging portion 12.

Thus, it is possible to easily pull out the handle 14 outward.

In the present embodiment, the locking pieces 17 are respectively arranged on both sides in the longitudinal direction of the upper surface cover 11.

Thus, it is possible to lock the keyboard cover 1 including the upper surface cover 11 to the instrument body 3 evenly and stably.

The locking pieces 17 are provided only on both sides of the upper surface cover 11 and thereby do not cover the sound emitters 326 of speakers or the like. Thus, when the keyboard instrument 2 functions as a speaker, the keyboard cover 1 does not inhibit sound emission or the like.

In the present embodiment, at least in the front end portion of the upper surface cover 11, there are provided the first indicator 15 which indicates the central position in the longitudinal direction (left and right direction) of the upper surface cover 11 and the pair of second indicators 16 which are arranged on both sides of the first indicator 15 to be a guide of the folding position.

Thus, when folding the keyboard cover 1 in the longitudinal direction, it is possible to fold at the appropriate position by merely folding in accordance with these indicators 15 and 16.

Therefore, anyone can easily and promptly turn the keyboard cover 1 into the storable state.

In the storing method of the keyboard cover 1 in the present embodiment, the keyboard cover 1 which covers and protects the upper surface of the instrument body 3 including the keyboard 31 in the keyboard protecting state is turned into the folded state in which the entire keyboard cover 1 is folded to be compact, and the keyboard cover 1 is turned into the storable state of maintaining the folded state with the handle 14.

Thus, it is possible to store the keyboard cover 1 easily and promptly when the keyboard instrument 2 is used for performance.

In the present embodiment, when the keyboard cover 1 is turned into the folded state (third folded state), the handle 14 originally provided to the front hanging portion 12 or the like is rotated to be raised outward, to maintain the folded state of the keyboard cover 1 merely by suspending the entire keyboard cover with the handle 14 located outward.

Thus, it is possible to turn the keyboard cover 1 into the storable state easily without separately providing a member such as a belt or fastener for bundling up the keyboard cover 1.

The hook 41 to hook the keyboard cover 1 when the keyboard is used is provided to the keyboard instrument 2 which is the electronic musical instrument in the present embodiment.

Thus, when the keyboard instrument 2 is used for performance, it is possible to turn the keyboard cover 1 in the storable state into the stored/saved state easily, without any trouble in the place to put the keyboard cover 1. Also when the keyboard instrument 2 is moved, the keyboard instrument 2 can be moved with the keyboard cover 1 hooked to the hook 41, and thus, there is no concern about losing the keyboard cover 1.

The hook 41 in the present embodiment is for hooking the handle 14 of the keyboard cover 1 in the storable state.

Thus, anyone can turn the keyboard cover 1 into the stored/saved state easily.

In the present embodiment, the sound emitters 326 of speakers are provided at the positions not covered with locking pieces or the like even in the keyboard protecting state of covering the instrument body 3 with the keyboard cover 1, on the rear surface of the instrument body 3.

Thus, the sound emitting operation is not inhibited even in the keyboard protecting state, and the keyboard instrument 2 can function as a speaker.

In the present embodiment, the operator 324 and the display unit 325 are arranged at the positions not covered with the keyboard cover 1 in the keyboard protecting state, on the upper surface of the instrument body 3.

Thus, when the keyboard instrument 2 functions as a speaker in the keyboard protecting state, operation by the operator 324 and display by the display unit 325 are not inhibited by the keyboard cover 1.

MODIFICATION EXAMPLES

Though the embodiment of the present disclosure has been described above, the present disclosure is not limited to such embodiment, and various modifications can be made within the scope of the present disclosure.

For example, in the present embodiment, the stitch portions 13, 18 are provided to have the folded-in state in which the front hanging portion 12 and the locking pieces 17 overlap with the back surface of the upper surface cover 11 in the normal state. However, the method of having the front hanging portion 12 and the locking pieces 17 in the folded-in state of overlapping with the back surface of the upper surface cover 11 in the normal state is not limited to this.

In the present embodiment, the example shown in FIG. 17 shows a case of hooking the keyboard cover 1 to have the overlapping side β inwardly (inside the keyboard instrument 2, state facing the back side) when hooking the handle 14 to the hook 41. However, the direction of the keyboard cover 1 when hooked to the hook 41 is not limited to this. The keyboard cover 1 may be hooked to have the spine side α of the keyboard cover 1 inwardly (inside the keyboard instrument 2, state facing the back side).

The hook 41 may be provided on both of left and right sides of the keyboard instrument 2. In this case, the keyboard cover 1 is suspended from (hooked to) the hook 41 of the user-friendly side. The hook 41 may be detachable. In this case, the hook 41 may be attached to either the left or right reinforcing member 42, and the user can switch it to the easy-to-use side according to user's habit and the like.

Though the embodiment takes, as an example, a case where the hook 41 is attached to the legs 4 of the keyboard instrument 2, the position of the hook 41 is not particularly limited as long as it does not interfere with the performance or the like when the keyboard cover 1 is hooked to be in the stored/saved state. For example, the hook 41 may be provided on the rear surface of the instrument body 3.

Though the embodiment takes, as an example, a case where the first indicator 15 and the second indicators 16 are provided at the front end of the upper surface cover 11, the first indicator 15 and the second indicators 16 are not limited to the illustrated example. For example, the first indicator 15 and the second indicators 16 may be line markers or the like provided from the front end to the rear end of the upper surface cover 11.

Only the first indicator 15 or the second indicators 16 may be provided. Furthermore, the first indicator 15 and the second indicators 16 may not be provided in cases where the central position in the longitudinal direction is known without the markers, such as a case where the upper surface cover 11 or the like has different colors in the left and right.

Though the embodiment takes, as an example, a case where the handle 14 is attached to the front hanging portion 12 with the set screws, the configuration to attach the handle 14 is not limited to this. The handle 14 may be sewn to the front hanging portion 12 as long as the handle 14 can be changed from the state of being parallel to the front hanging portion 12 to the state of being pulled out outward.

Though the embodiment takes, as an example, a case where the locking pieces 17 forming a pair are provided at both sides in the longitudinal direction (that is, left and right direction) of the upper surface cover 11, the locking pieces 17 is not limited to this configuration. For example, the locking piece may be provided also to the central position in addition to both ends in the longitudinal direction of the upper surface cover 11. Depending on the position of the sound emitters 326, the locking piece may be provided to the entire rear end (over the entire longitudinal direction) of the upper surface cover 11.

Though the embodiment takes, as an example, a case where the operator 324 and the display unit 325 are provided on the upper surface of the let sleeve 321 of the instrument body 3, the positions of the operator 324 and the display unit 325 are not limited to this. For example, in the case where the operator 324 and the display unit 325 are arranged on the lateral surface or the like of the instrument body 3, the length in the longitudinal direction (left and right direction) of the keyboard cover 1 may be a length covering the entire instrument body 3 including the left and right sleeves 321.

Furthermore, if either one of the controller 324 and the display unit 325 is not covered by the keyboard cover 1, it is not essential that both are exposed. For example, only the display unit 325 may be exposed from the keyboard cover 1 in a case where the display unit 325 has a touch panel or the like.

The present embodiment takes, as an example, a case where, in the storable state, the entire keyboard cover 1 is folded to be compact and the folded state is maintained by the handle 14. However, folding the keyboard cover 1 to turn into the storable state is not essential.

For example, the entire keyboard cover 1 may be rolled to be compact as long as the compact state can be held by the handle 14.

The present embodiment takes, as an example, a case of providing the locking pieces 17 which are provided at the rear end of the upper surface cover so as to be able to hang down on the rear end of the instrument body in the keyboard protecting state. However, it is not essential to include the locking pieces 17. In the case of not providing the locking pieces 17, a non-slip substance or the like may be provided to the back surface of the rear portion of the upper surface cover so as not to displace the keyboard cover 1.

Though the present embodiment takes, as an example, a case of providing the handle 14 on the front surface side of the front hanging portion, the position to provide the handle 14 is not limited to this.

For example, the handle 14 may be provided to the back surface side of the front hanging portion 12.

In this case, when the keyboard cover 1 is folded, the keyboard cover 1 is turned into the folded-in state by folding back the front hanging portion 12 to the front side of the upper surface cover 11 so that the handle 14 appears on the front side. Also, when the entire keyboard cover 1 is folded, the ends in the longitudinal direction of the upper surface cover 11 and the front hanging portion 12 are folded in to the back surface side of the upper surface cover 11 so that the folded portion is not laid on the handle 14. Thus, when the entire keyboard cover 1 is folded finally, it is possible to hold, with the handle 14, the state in which the keyboard cover 1 is made compact similarly to the state shown in FIGS. 15 and 16.

Although several embodiments of the present disclosure have been described, the scope of the present disclosure is not limited to the above-described embodiments and includes the scope of the present disclosure that is described in the claims and the equivalents thereof.

The invention claimed is:

1. A keyboard cover comprising:
    an upper surface cover configured to cover at least a portion of an upper surface of an instrument body including a keyboard;
    a front hanging portion provided at a front end of the upper surface cover, the front hanging portion being configured to be folded into a folded-in state of overlapping with the upper surface cover from a state in which the front hanging portion hangs down so as to cover at least a portion of a front end surface of the keyboard; and
    a handle provided to the front hanging portion so as to extend in a longitudinal direction of the front hanging portion,
    wherein the handle is configured to be bent to be deformed, and
    wherein the handle is configured, while being bent, to maintain a compact state in which the upper surface cover and the fornt hanging portion are made compact.

2. The keyboard cover according to claim 1, wherein the upper surface cover and the front hanging portion are configured to be folded in the longitudinal direction of the front hanging portion to be in the compact state.

3. The keyboard cover according to claim 1, further comprising a locking piece provided at a rear end of the upper surface cover, the locking piece being configured to be folded into a folded-in state of overlapping with a back surface of the upper surface cover from a state in which the locking piece hangs down so as to cover at least a portion of a rear end of the instrument body.

4. The keyboard cover according to claim 3, further comprising two of the locking piece, wherein each of the two locking piece is located on respective end sides in a longitudinal direction of the upper surface cover.

5. The keyboard cover according to claim 1, wherein:
the front hanging portion is configured to be folded into the folded-in state by being folded so a back surface of the front hanging portion faces a back surface of the upper surface cover; and
the handle is provided on a front surface of the front hanging portion.

6. The keyboard cover according to claim 1, wherein:
the handle is located at such a position that a center of the handle matches a center of the upper surface cover in a longitudinal direction of the upper surface cover; and
ends of the handle are located on respective sides of the center of the upper surface cover in the compact state.

7. The keyboard cover according to claim 1, further comprising set screws configured to attach ends of the handle to the front hanging portion while allowing the ends of the handle to be rotated about centers of the set screws while the handle is bent to be deformed to maintain the compact state of the upper surface cover and the front hanging portion.

8. The keyboard cover according to claim 1, wherein a first indicator indicating a central position in a longitudinal direction of the upper surface cover and a pair of second indicators that are located on respective sides of the first indicator to be a guide of a folding position of the upper surface cover and the front hanging portion in the compact state are provided to at least the front end of the upper surface cover.

9. An electronic musical instrument comprising:
the keyboard cover according to claim 1; and
the instrument body,
wherein the instrument body comprises a hook configured to hook the handle of the keyboard as the handle maintains the compact state of the upper surface cover and the front hanging portion.

10. A storing method of a keyboard cover that includes: an upper surface cover configured to cover at least a portion of an upper surface of an instrument body including a keyboard; a front hanging portion provided at a front end of the upper surface cover, the front hanging portion being configured to be folded into a folded-in state of overlapping with the upper surface cover from a state in which the front hanging portion hangs down so as to cover at least a portion of a front end surface of the keyboard; and a handle provided to the front hanging portion so as to extend in a longitudinal direction of the front hanging portion, wherein the handle is configured to be bent to be deformed, the storing method comprising:
folding the front hanging portion into the folded-in state of overlapping with the upper surface cover;
making the upper surface cover and the front hanging portion, in the folded-in state, into a compact state in which the upper surface cover and the front hanging portion are compact, and making the handle bent to be deformed; and
maintaining, with the handle, while the handle is bent to be deformed, the compact state of the upper surface cover and the front hanging portion.

11. The storing method according to claim 10, wherein:
the keyboard cover further includes a locking piece provided at a rear end of the upper surface cover, the locking piece being configured to be folded into a folded-in state of overlapping with the upper surface cover from a state in which the locking piece hangs down so as to cover at least a portion of a rear end of the instrument body; and
the storing method further comprises folding the locking piece into the folded-in state of overlapping with the upper surface cover.

12. The storing method according to claim 10, further comprising:
folding the upper surface cover and the front hanging portion in the longitudinal direction of the front hanging portion to be in the compact state.

13. The storing method according to claim 10, wherein:
the handle is provided on a front surface of the front hanging portion; and
the storing method further comprises folding the front hanging portion into the folded-in state by being folded so a back surface of the front hanging portion faces a back surface of the upper surface cover.

14. The storing method according to claim 10, wherein:
the handle is located at such a position that a center of the handle matches a center of the upper surface cover in a longitudinal direction of the upper surface cover; and
ends of the handle are located on respective sides of the center of the upper surface cover in the compact state, wherein the storing method further comprises folding ends of the front hanging portion and the upper surface cover, in the folded-in state, towards the center of the upper surface cover.

15. The storing method according to claim 10, wherein:
the keyboard cover further comprises set screws configured to attach end of the handle to the front hanging portion while allowing the ends of the handle to be rotated about centers of the set screws while the handle is bent to be deformed; and
the storing method further comprises rotating the ends of the handle about centers of the set screws while the handle is bent to be deformed to maintain the compact state of the upper surface cover and the front hanging portion.

16. The storing method according to claim 10,
wherein a first indicator indicating a central position in a longitudinal direction of the upper surface cover and a pair of second indicators that are located on respective sides of the first indicator to be a guide of a folding position of the upper surface cover and the front hanging portion in the compact state are provided to at least the front end of the upper surface cover, and
wherein the storing method further comprising:
folding ends of the front hanging portion and the upper surface cover in the folded- in state in the longitudinal direction of the front hanging portion towards the pair of second indicators, respectively, to be in a first folded state;
folding ends of the front hanging portion and the upper surface cover in the first folded state in the longitudinal direction of the front hanging portion towards the pair of second indicators, respective, to be in a second folded state; and folding ends of the front hanging portion and the upper surface cover in the second folded state in the longitudinal direction of the front hanging portion towards the first indicator to be in the compact state.

17. The storing method according to claim 16, wherein:

the keyboard cover further comprises set screws configured to attach end of the handle to the front hanging portion while allowing the ends of the handle to be rotated about centers of the set screws while the handle is bent to be deformed; and the storing method further comprises rotating the ends of the handle about centers of the set screws while the handle is bent to be deformed to maintain the compact state of the upper surface cover and the front hanging portion.

\* \* \* \* \*